(12) United States Patent
Li et al.

(10) Patent No.: US 9,812,080 B2
(45) Date of Patent: Nov. 7, 2017

(54) DRIVING MODE SWITCHING METHOD AND MODULE, AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Xinghua Li, Beijing (CN); Fucheng Yang, Beijing (CN); Seung Yik Park, Beijing (CN); Quanmin Zhong, Beijing (CN); Xue Jiang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 15/307,970

(22) PCT Filed: Jan. 28, 2016

(86) PCT No.: PCT/CN2016/072491
§ 371 (c)(1),
(2) Date: Oct. 31, 2016

(87) PCT Pub. No.: WO2017/041420
PCT Pub. Date: Mar. 16, 2017

(65) Prior Publication Data
US 2017/0270877 A1  Sep. 21, 2017

(30) Foreign Application Priority Data
Sep. 11, 2015  (CN) .......................... 2015 1 0580190

(51) Int. Cl.
*G09G 3/36* (2006.01)
*G09G 5/02* (2006.01)
(Continued)

(52) U.S. Cl.
CPC .......... *G09G 3/3614* (2013.01); *G06T 5/002* (2013.01); *G06T 7/13* (2017.01); *G06T 7/90* (2017.01);
(Continued)

(58) Field of Classification Search
CPC .......... G09G 3/3614; G09G 5/10; G09G 5/02; G09G 2320/0666; G09G 2320/0209;
(Continued)

(56) References Cited

U.S. PATENT DOCUMENTS

| 9,424,787 B2 * | 8/2016 | Park | G09G 3/3611 |
| 2012/0200553 A1 * | 8/2012 | Wu | G09G 3/3614 345/211 |

(Continued)

FOREIGN PATENT DOCUMENTS

| CN | 101097696 A | 1/2008 |
| CN | 101286303 A | 10/2008 |

(Continued)

OTHER PUBLICATIONS

Written Opinion of the International Searching Authority from corresponding PCT Application No. PCT/CN2016/072491, dated Jun. 15, 2016 (4 pages).
(Continued)

*Primary Examiner* — Ryan A Lubit
(74) *Attorney, Agent, or Firm* — Harness, Dickey & Pierce, P.L.C.

(57) ABSTRACT

A driving mode switching method, a driving mode switching module and a display device are provided. The method comprises: acquiring a pre-processed reference image; iden-
(Continued)

tifying an image characteristic of the reference image; generating a color block set included in the reference image by dividing the reference image into color blocks in accordance with the identification of the image characteristic of the reference image; calculating a coupling voltage of each of the color blocks and a brightness difference corresponding to the coupling voltage in accordance with an order of the color blocks included in the color block set; determining a crosstalk in accordance with the brightness difference corresponding to the coupling voltage; and switching a driving mode in accordance with the crosstalk. According to an exemplary embodiment of the present invention, since the driving mode can be switched, it is possible to prevent the display from being prone to crosstalk due to being constantly arranged to the column inversion mode, the row inversion mode or the frame inversion mode, or a display abnormality that may occur due to being arranged to the dot inversion driving.

20 Claims, 7 Drawing Sheets

(51) Int. Cl.
G09G 5/10 (2006.01)
G06T 5/00 (2006.01)
G06T 7/13 (2017.01)
G06T 7/90 (2017.01)

(52) U.S. Cl.
CPC .................. *G09G 5/02* (2013.01); *G09G 5/10* (2013.01); *G09G 2320/0209* (2013.01); *G09G 2320/0666* (2013.01); *G09G 2370/18* (2013.01)

(58) Field of Classification Search
CPC ......... G09G 2370/18; G06T 7/90; G06T 7/13; G06T 5/002
See application file for complete search history.

(56) References Cited

U.S. PATENT DOCUMENTS

2014/0071105 A1* 3/2014 Nakanishi ............ G09G 3/3614
 345/209
2014/0232624 A1* 8/2014 Kim ..................... G09G 3/3696
 345/87

FOREIGN PATENT DOCUMENTS

| CN | 102789775 A | 11/2012 |
| CN | 103065591 A | 4/2013 |
| CN | 105206233 A | 12/2015 |

OTHER PUBLICATIONS

International Search Report from corresponding PCT Application No. PCT/CN2016/072491, dated Jun. 15, 2016 (5 pages).

* cited by examiner

DRIVING MODE SWITCHING METHOD AND MODULE, AND DISPLAY DEVICE

CROSS-REFERENCE TO RELATED APPLICATION

This application claims priority to Chinese Patent Application No. 201510580190.3 filed on Sep. 11, 2015, the disclosure of which is incorporated herein in its entirety as part of the present application.

FIELD

Exemplary embodiments of the present invention relate to a driving mode switching method and module, and a display device.

BACKGROUND

In the field of display, especially in the field of small and medium size mobile display products, the consumer's demands for display quality are increasing, which promotes the thin film transistor liquid crystal display TFT-LCD as the representative of the flat panel display to continuously pursue a higher display effect, thus improving the display PPI becomes the development trend. With the improvement of the PPI, the size of the TFT driving unit is becoming smaller, which results in higher precision and smaller error requirement in the TFT manufacturing process. Therefore, it is difficult to control the TFT characteristics and parasitic capacitance of the TFT driving unit, thus it is difficult to improve and control the crosstalk and other adverse factors of the display. The crosstalk of the TFT-LCD is associated with the process design, process procedure and so on of the TFT-LCD. Crosstalk can be categorized into a horizontal crosstalk and a vertical crosstalk according to phenomena and mechanisms. In order to solve many problems of process procedure, the crosstalk caused by the parasitic capacitance is improved through a pixel-driven compensation in the industry. Since the liquid crystal molecules driven by a DC voltage may be polarized to lead to an image residual, the signal for driving pixels drives the liquid crystal molecules using a method of alternating voltages having positive and negative polarities. According to different polarity inversions, the pixel driving signal mainly has frame inversion mode, column inversion mode, row inversion mode, and dot inversion mode (especially, 2 dots inversion mode). Column inversion and dot inversion are more widely used due to the advantages of display effect, driving ability and other comprehensive factors.

Generally, column inversion has advantages of good display effect, strong driving ability, lower power, etc., but column inversion has the same voltage polarity in a vertical direction, thus there is no inhibition of the vertical crosstalk, and the vertical crosstalk is apt to occur. The dot inversion (such as 1 dot inversion, 2 dots inversion, 4 dots inversion, 8 dots inversion and so on, and usually 2 dots inversion) driving is capable of solving/eliminating the vertical crosstalk caused by the TFT parasitic capacitance by changing the polarity of the driving voltage in the vertical direction, thus the dot inversion driving is usually used to solve the vertical crosstalk problem which may be not solved by the column inversion. However, one disadvantage of the dot inversion drive is that the driving ability of the signal is relatively weak, so that when the display is driven by the dot inversion, there may be an abnormality problem under certain conditions due to the insufficient driving ability.

Conventional TFT-LCD driving mode using a fixed mode (such as constantly using the column or dot inversion), but different driving methods have their own shortcomings, so the display trends to show the corresponding adverse results in certain situations. For example, many TFT-LCDs are prone to the vertical crosstalk under the column inversion, and similarly, the horizontal crosstalk easily occurs under the row inversion. If the dot inversion is constantly used, the display may have an abnormal display problem in pictures due to the driving ability.

SUMMARY

According to exemplary embodiments of the present invention, a driving mode switching method and device, and a display device are provided, which may be possible to prevent the display from being prone to crosstalk due to being constantly arranged to a column inversion mode, a row inversion mode or a frame inversion mode, or a display abnormality that may occur due to being arranged to the dot inversion driving.

According to a first aspect of the present invention, a driving mode switching method is provided, which comprises:

acquiring a pre-processed reference image;

identifying an image characteristic of the reference image;

generating a color block set included in the reference image by dividing the reference image into color blocks in accordance with the identification of the image characteristic of the reference image;

calculating a coupling voltage of each of the color blocks and a brightness difference corresponding to the coupling voltage in accordance with an order of the color blocks included in the color block set;

determining a crosstalk in accordance with the brightness difference corresponding to the coupling voltage; and switching a driving mode in accordance with the crosstalk.

According to an exemplary embodiment of the present invention, the image characteristic comprises an image edge and/or an image color region.

According to an exemplary embodiment of the present invention, before acquiring a pre-processed reference image, the method further comprises:

determining an image update frequency of a display device, and acquiring the pre-processed reference image when the image update frequency is less than a first preset frequency.

According to an exemplary embodiment of the present invention, the first preset frequency is a critical frequency of the crosstalk visible to the human eye.

According to an exemplary embodiment of the present invention, acquiring the pre-processed reference image comprises:

reading a display image to be output to a display panel from a graphics memory; and acquiring the reference image by performing a de-noising processing on the display image.

According to an exemplary embodiment of the present invention, acquiring the pre-processed reference image further comprises allocating a processing space having a first capacity to the reference image in the graphics memory.

According to an exemplary embodiment of the present invention, identifying the image characteristic of the reference image comprises:

extracting an image edge included in the reference image; and/or extracting an image color region included in the reference image.

According to an exemplary embodiment of the present invention, generating the color block set included in the reference image by dividing the reference image into color blocks in accordance with the identification of the image characteristic of the reference image comprises:

dividing the reference image into a plurality of color blocks in accordance with the image edge and/or the image color region included in the reference image; and defining continuous color blocks that intersect in a column direction or a horizontal direction as the color block set.

According to an exemplary embodiment of the present invention, calculating a coupling voltage of each of the color blocks and a brightness difference corresponding to the coupling voltage in accordance with an order of the color blocks included in the color block set comprises:

acquiring color information of each of sub-pixels in the reference image in accordance with the order of the color blocks included in the color block set;

calculating a color voltage corresponding to each of the color blocks in accordance with the color information of each of sub-pixels;

calculating the coupling voltage to which each of the color blocks is subjected in accordance with the color voltage corresponding to each of the color blocks; and calculating the brightness difference caused by the coupling voltage.

According to an exemplary embodiment of the present invention, the method further comprises:

calculating a color uniformity of each of the color blocks in the color block set; and sorting the color blocks in the color block set in accordance with the color uniformity of each of the color blocks.

According to an exemplary embodiment of the present invention, the color uniformity comprises a region uniformity and/or a color brightness characteristic.

According to an exemplary embodiment of the present invention, the method further comprises:

determining a color block as a bottom color block if the region uniformity of the color block is less than a first color threshold;

determining the color block as a intermediate color block if the region uniformity of the color block is greater than or equal to the first color threshold and the color brightness characteristic of the color block is greater than or equal to a second color threshold and is less than or equal to a third color threshold; and determining the color block as a top color block if the region uniformity of the color block is greater than or equal to the first color threshold and the color brightness characteristic of the color block is less than the second color threshold or if the region uniformity of the color block is greater than or equal to the first color threshold and the color brightness characteristic of the color block is greater than the third color threshold.

According to an exemplary embodiment of the present invention, the driving mode comprises at least one of a frame inversion mode, a column inversion mode, a row inversion mode and a dot inversion mode.

According to an exemplary embodiment of the present invention, the driving mode switching comprises driving mode switching of partial display area and/or driving mode switching of entire display area.

According to a further aspect of the present invention, a driving mode switching module is provided, which comprises:

an image acquisition unit, arranged to acquire a pre-processed reference image;

a characteristic identification unit, arranged to identify an image characteristic of the reference image;

a color block division unit, arranged to generate a color block set included in the reference image by dividing the reference image into color blocks in accordance with the identification of the image characteristic of the reference image;

a calculation unit, arranged to calculate a coupling voltage of each of the color blocks and a brightness difference corresponding to the coupling voltage in accordance with an order of the color blocks included in the color block set;

a determination unit, arranged to determine a crosstalk in accordance with the brightness difference corresponding to the coupling voltage; and a switching unit, arranged to switch a driving mode in accordance with the crosstalk.

According to an exemplary embodiment of the present invention, the image characteristic comprises an image edge and/or an image color region.

According to an exemplary embodiment of the present invention, the module further comprises:

a frequency detection unit, arranged to determine an image update frequency of a display device, and to instruct the image acquisition unit to acquire the pre-processed reference image when the image update frequency is less than a first preset frequency.

According to an exemplary embodiment of the present invention, wherein the first preset frequency is a critical frequency of the crosstalk visible to the human eye.

According to an exemplary embodiment of the present invention, the image acquisition unit comprises:

a reading subunit, arranged to read a display image to be output to a display panel from a graphics memory; and a de-noising subunit, arranged to acquire the reference image by performing a de-noising processing on the display image.

According to an exemplary embodiment of the present invention, the de-noising subunit is further arranged to allocate a processing space having a first capacity to the reference image in the graphics memory.

According to an exemplary embodiment of the present invention, the characteristic identification unit comprises:

an edge extracting subunit, arranged to extract an image edge included in the reference image; and/or a color extracting subunit, arranged to extracting an image color region included in the reference image.

According to an exemplary embodiment of the present invention, the color block division unit comprises:

a division subunit, arranged to divide the reference image into a plurality of color blocks in accordance with the image edge and/or the image color region included in the reference image; and a definition subunit, arranged to define continuous color blocks that intersect in a column direction or a horizontal direction as the color block set.

According to an exemplary embodiment of the present invention, the calculation unit comprises:

a color information acquisition subunit, arranged to acquire color information of each of sub-pixels in the reference image in accordance with the order of the color blocks included in the color block set;

a color voltage calculation subunit, arranged to calculate a color voltage corresponding to each of the color blocks in accordance with the color information of each of sub-pixels;

a coupling voltage calculation subunit, arranged to calculate the coupling voltage to which each of the color blocks is subjected in accordance with the color voltage corresponding to each of the color blocks; and a brightness calculation subunit, arranged to calculate the brightness difference caused by the coupling voltage.

According to an exemplary embodiment of the present invention, the calculation unit further comprises:

an uniformity calculation subunit, arranged to calculate a color uniformity of each of the color blocks in the color block set; and a sorting subunit, arranged to sort the color blocks in the color block set in accordance with the color uniformity of each of the color blocks.

According to an exemplary embodiment of the present invention, the color uniformity comprises a region uniformity and/or a color brightness characteristic.

According to an exemplary embodiment of the present invention, the uniformity calculation subunit is further arranged to:

determine a color block as a bottom color block if the region uniformity of the color block is less than a first color threshold;

determine a color block as a intermediate color block if the region uniformity of the color block is greater than or equal to the first color threshold and the color brightness characteristic of the color block is greater than or equal to a second color threshold and is less than or equal to a third color threshold; and determine a color block as a top color block if the region uniformity of the color block is greater than or equal to the first color threshold and the color brightness characteristic of the color block is less than the second color threshold or if the region uniformity of the color block is greater than or equal to the first color threshold and the color brightness characteristic of the color block is greater than the third color threshold.

According to an exemplary embodiment of the present invention, the driving mode switching comprises driving mode switching of partial display area and/or driving mode switching of entire display area.

According to a yet further aspect of the present invention, a display device is provided, which comprises any one driving mode switching module described as above.

The driving mode switching method and device, and a display device according to an exemplary embodiment of the present invention can be capable of firstly acquiring a pre-processed reference image; identifying an image characteristic of the reference image; generating a color block set included in the reference image by dividing the reference image into color blocks in accordance with the identification of the image characteristic of the reference image; calculating a coupling voltage of each of the color blocks and a brightness difference corresponding to the coupling voltage in accordance with an order of the color blocks included in the color block set; determining a crosstalk in accordance with the brightness difference corresponding to the coupling voltage; and finally switching a driving mode in accordance with the crosstalk. Since the driving mode can be switched, it is possible to prevent the display from being prone to crosstalk due to being constantly arranged to the column inversion mode, the row inversion mode or the frame inversion mode, or a display abnormality that may occur due to being arranged to the dot inversion driving.

BRIEF DESCRIPTION OF THE DRAWINGS

In order to more clearly illustrate the technical solutions in embodiments of the present invention or in the prior art, the drawings to be used in the description of the embodiments or in the prior art will be briefly introduced below. Apparently, the drawings in the following description are only for some embodiments of the present invention, those of ordinary skill in the art may also obtain other drawings from these drawings, without creative efforts.

DETAILED DESCRIPTION

The technical solution in embodiments of the present invention will be clearly and completely described in combination with the drawings in the embodiments of the present invention. Apparently, the described embodiments are merely part of the embodiments of the present invention, instead of all the embodiments. All other embodiments obtained by those skilled in the art based on the embodiments of the present invention without creative work fall within the scope of the present invention.

Further, in the present disclosure, the terms "first", "second" and "third" are used for purposes of illustration only and are not to be taken as an indication or suggestion of relative importance. The term "a plurality of" refers to two or more than two, unless otherwise specifically defined.

Figure 1:
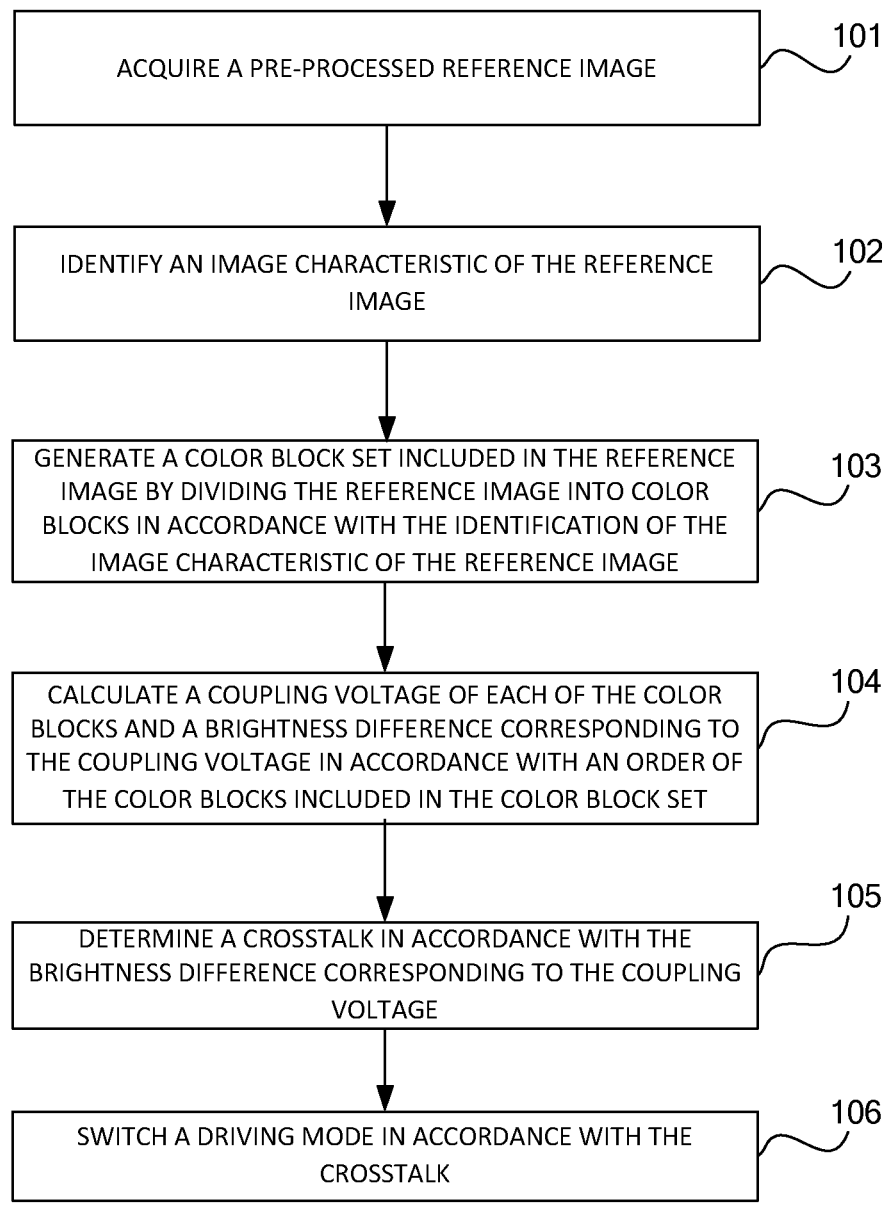
FIG. 1 is a schematic flowchart of a driving mode switching method according to one embodiment of the present invention.

Referring to FIG. 1, a driving mode switching method according to one embodiment of the present invention comprises:

101: acquiring a pre-processed reference image;

102: identifying an image characteristic of the reference image, wherein the image characteristic comprises an image edge and/or an image color region;

103: generating a color block set included in the reference image by dividing the reference image into color blocks in accordance with the identification of the image characteristic of the reference image;

104: calculating a coupling voltage of each of the color blocks and a brightness difference corresponding to the coupling voltage in accordance with an order of the color blocks included in the color block set;

105: determining a crosstalk in accordance with the brightness difference corresponding to the coupling voltage; and 106: switching a driving mode in accordance with the crosstalk.

The driving mode switching method according to one embodiment of the present invention can be capable of firstly acquiring a pre-processed reference image; identifying an image characteristic of the reference image; generating a color block set included in the reference image by dividing the reference image into color blocks in accordance with the identification of the image characteristic of the reference image; calculating a coupling voltage of each of the color blocks and a brightness difference corresponding to the coupling voltage in accordance with an order of the color blocks included in the color block set; determining a crosstalk in accordance with the brightness difference corresponding to the coupling voltage; and finally switching a driving mode in accordance with the crosstalk. Since the driving mode can be switched, it is possible to prevent the display from being prone to crosstalk due to being constantly arranged to the column inversion mode, the row inversion mode or the frame inversion mode, or a display abnormality that may occur due to being arranged to the dot inversion driving.

Figure 2:
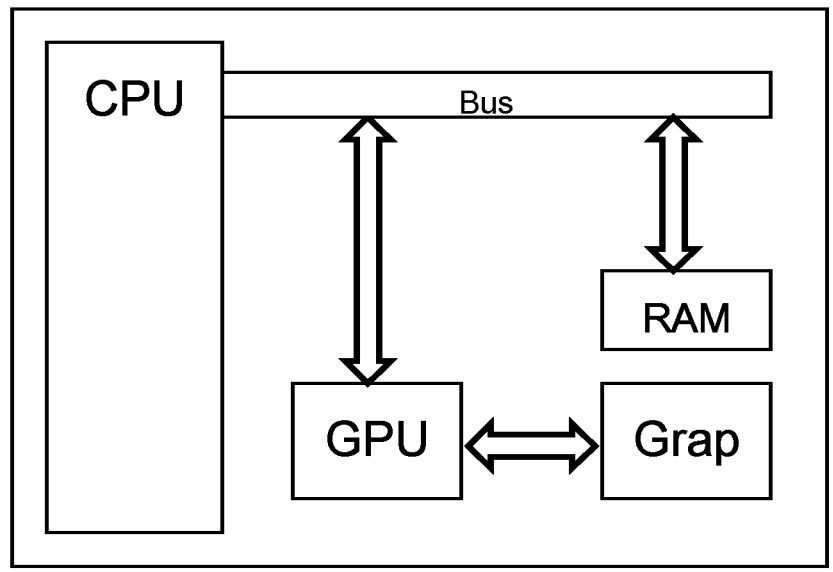
FIG. 2 is a structural schematic view of an architecture of an operation system for a driving mode switching method according to one embodiment of the present invention.

In particular, the embodiment of the present application is further described in connection with the system architecture shown in FIG. 2, wherein the system architecture shown in FIG. 2 comprises a central processor CPU, a bus Bus, a graphics processor GPU, a random access memory RAM and a graphics memory, in which the graphics memory is a memory for storing display image information. Of course, this is merely a example, wherein the GPU can be integrated into the graphics card or independently as a chip integrated on the mother board, or can be integrated into CPU to form a system-on-chip SOC together.

Figure 3:
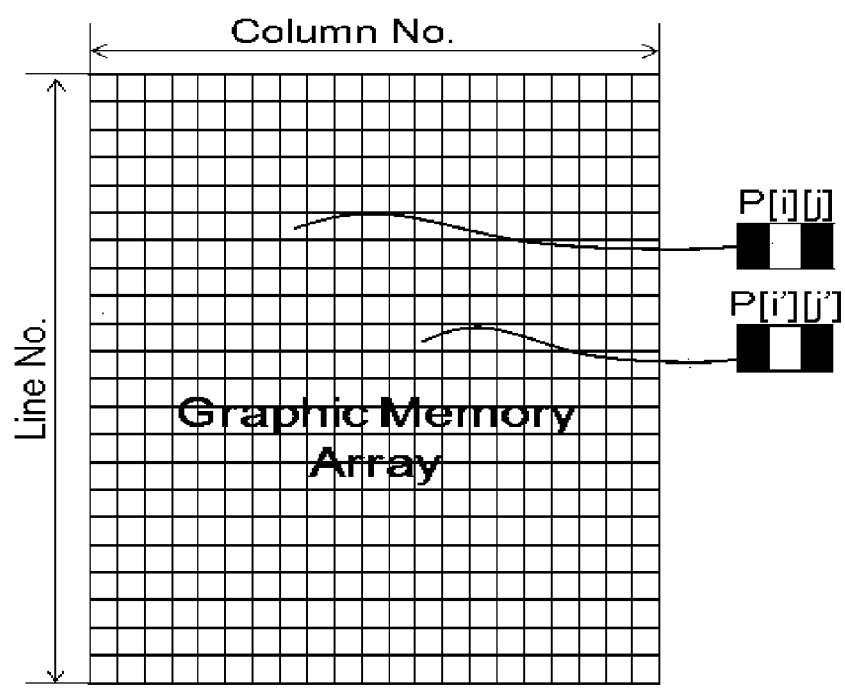
FIG. 3 is a structural schematic view of an image data storage matrix of a graphics memory according to one embodiment of the present invention.
Figure 4:
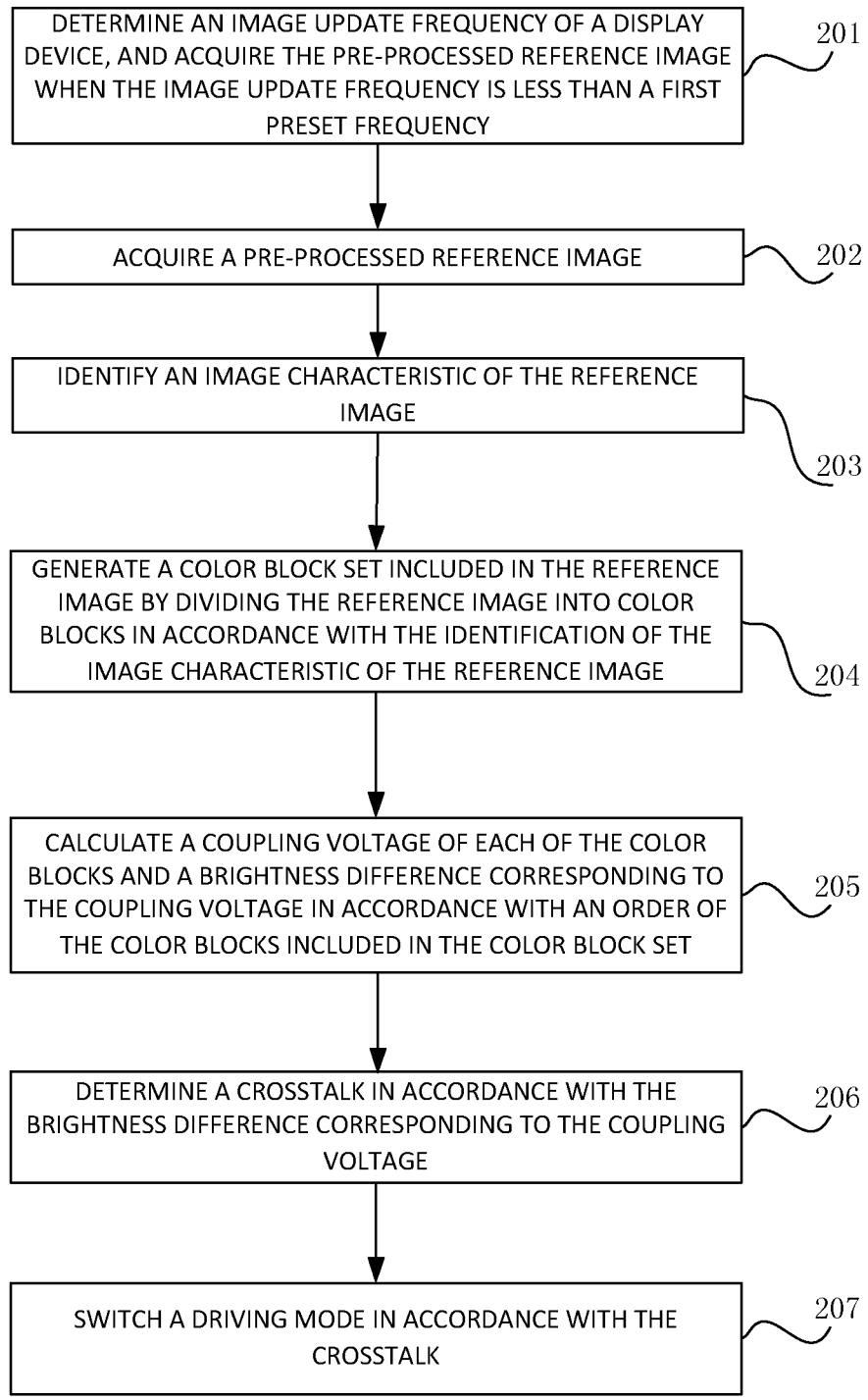
FIG. 4 is a schematic flowchart of a driving mode switching method according to another embodiment of the present invention.

For the display such as the TFT-LCD or the like, the pixel data can be composed of red, green, and blue (RGB) three primary color coding rules and is illustrated with a 24-bit true color display system. FIG. 3 shows an array structure of a graphics memory, the storage capacity thereof should be large enough. FIG. 3 shows an image data storage matrix of the graphics memory, wherein the minimum capacity of the graphics memory is related to the resolution of the LCD and the image processing algorithms. As shown in FIG. 3, a size of the array of the graphics memory is defined as a group P[m][n], wherein M is the row number of the row where the pixel is located, n is the column number of the column where the pixel is located, wherein the data bit width can be determined according to the color bit width, and the image color information of the display is stored in the two-dimensional group P[m] [n] in a RGB color mode. FIG. 3 shows that the pixel groups P[i][j] and P[I'][j'] are chosen. Based on the system architecture described as above, as shown in FIG. 4, the driving mode switching method according to one embodiment of the present invention may further comprise steps 201-207.

At step 201, an image update frequency of a display device is determined, and the pre-processed reference image is acquired when the image update frequency is less than a first preset frequency, wherein the first preset frequency is a critical frequency of the crosstalk visible to the human eye. It will be appreciated that when the image update frequency is equal to or greater than the first preset frequency, the crosstalk which is visible to the human eye may not be generated.

At step 202, a pre-processed reference image is acquired. Particularly, step 202 may further comprise:

202-a: reading a display image to be output to a display panel from a graphics memory. In one exemplary embodiment, if in the array of the graphics memory, the image is stored in the groups in pixels, the step is particularly that acquiring the display image to be output to the LCD from the graphics memory; and 202-b: acquiring the reference image by performing a de-noising processing on the display image, and allocating a processing space having a first capacity to the reference image in the graphics memory. In one exemplary embodiment, at step 202-b, considering that an original image displayed onto the LCD may have a noise, etc., a smooth de-noising may be performed on the original image at this stage, in order to facilitate image analysis and edge calculation. Meantime, according to an operating space of the algorithm of image contour recognition, it is necessary to develop an image data buffer area which is several times (generally, 3 times, 4 times and so on) than the size of the original image, and the specific size of the buffer area is determined by the operating space of the algorithm of the image contour identification.

At step 203, an image characteristic of the reference image is identified, wherein the image characteristic comprises an image edge and/or an image color region.

According to an exemplary embodiment of the present invention, at step 203, the purpose of identifying the image characteristic is that: dividing the image into color blocks of different characteristic regions according to their contours and color uniformity, these color blocks have similar characteristics in morphology and/or color, and the key of the characteristic identification lies in the selection of an identifying algorithm, a contour threshold and a region threshold, wherein the selection factors of the contour threshold and the region threshold may comprise: a) image color values at which a reference visible crosstalk is apt to occur, generally, the higher the brightness of the image is, the weaker the crosstalk is; and 2) reference color image uniformity, a visible crosstalk is usually occurred in images of pure colors, or nearly pure color, that is, the worse the color uniformity is, and the higher the color non-uniformity density is, more difficult the crosstalk occurred.

For the identification and division of the image characteristic, there are edge extraction methods (such as Sobel operator, Canny operator, etc.), region division algorithm and other algorithms. Different algorithms have different accuracy, and also have different adaptability. Therefore, an exemplary embodiment of the present invention, based on the characteristics of the occurrence of crosstalk, uses an edge detection algorithm, and a region division and merging algorithm together to perform the image region identification. Of course, more algorithms may also be used, which are no longer listed here.

In particular, step 203 of identifying the image characteristic of the reference image may comprise step 203-a and step 203-b.

At step 203-a, an image edge included in the reference image is extracted.

Step 203-a is performed mainly through an image edge detection algorithm, and after the image edge extraction, the image can be preliminarily classified by contour. In particular, step 203-a may mainly comprise: a) image contour identification, the image contour is identified by extracting the image edge through an algorithm such as the classical first-order differential algorithm, second-order differential algorithm edge detection algorithm and related optimization derived algorithm, wherein the image herein may be a gray-scale image, a color image and so on; b) image contour post-processing, such as an edge refinement, an edge connection and so on.

At step 203-b, an image color region included in the reference image is extracted.

The purpose of extracting the image color region is that: in addition to improving the accuracy of the edge identification, the color region can be extracted in terms of colors. According to an exemplary embodiment of the present invention, the accuracy of division and identification for the image region can be improved by the region division and merging algorithm (or other related optimization algorithms). According to an exemplary embodiment of the present invention, a quadtree decomposition method is provided, in which the whole image is considered as one region, and the image is divided into non-overlapping regions having arbitrary sizes by using the image edge information. Here, each region may be divided into four rectangular regions and then merged or divided, until the color consistency of the divided region meets the threshold requirement.

At step 204, a color block set included in the reference image is generated by dividing the reference image into color blocks in accordance with the identification of the image characteristic of the reference image.

In particular, step 204 further comprises:

204-a: dividing the reference image into a plurality of color blocks in accordance with the image edge and/or the image color region included in the reference image; and

204-b: defining continuous color blocks that intersect in a column direction or a horizontal direction as the color block set.

According to an exemplary embodiment of the present invention, after the image identification, regions are divided in accordance with the image edge and/or the image color region, then the region uniformity of the color blocks of the image is identified by color block processing, such that a bottom color block, a intermediate color block and a top color block are divided. The adjacent color blocks that intersect in the column or horizontal direction are defined as the color block set, wherein vertical crosstalk is associated with different color blocks in a vertical direction, whereas horizontal crosstalk is associated with different color blocks in a horizontal direction.

According to an exemplary embodiment of the present invention, the method further comprises steps 204-c to 204-g.

At step 204-c, a color uniformity of each of the color blocks in the color block set is calculated, wherein the color uniformity comprises a region uniformity and/or a color brightness characteristic.

In particular, the basic color unit point of the color block may be defined as n*pixels (the number of pixels per inch), n may be a larger value, or n may be set as the number of pixels that the human eye may visually recognize. The color uniformity is calculated by taking the point as a basic unit, and statistical methods can be used to calculate the standard deviation, the process capacity index CPK and so on.

At step 204-d, when the region uniformity of the color block is less than a first color threshold, the color block is determined as the bottom color block.

At step 204-e, when the region uniformity of the color block is greater than or equal to the first color threshold, and the color brightness characteristic is greater than or equal to a second color threshold and is less than or equal to a third color threshold, the color block is determined as the intermediate color block.

At step 204-f, when the region uniformity of the color block is greater than or equal to the first color threshold, and the color brightness characteristic is less than the second color threshold and greater than the third color threshold, the color block is determined as the top color block.

According to an exemplary embodiment of the present invention, steps 204-d to 204-f are provided to determine the color uniformity. In particular, for the color block uniformity, a first color threshold Ath (a certain requirement that the region consistency meets), a second color threshold Bth, and a third color threshold Cth (a certain requirement that the color brightness meets) are set: when the region uniformity A<Ath, the color uniformity is relatively poor, the crosstalk is less likely to occur, thus the color block is the bottom color block; when A≥Ath, B≥Bth and B≤Cth, the color uniformity is relatively good, and the brightness characteristic is relatively good, the crosstalk is likely to occur, thus the block color is the intermediate color block; and when A≥Ath and B<Bth, or A≥Ath and B>Cth, the color uniformity is relatively good, the brightness characteristic is relatively poor, the visible crosstalk is less likely to occur, thus the color block is the top color block.

According to an exemplary embodiment of the present invention, the thresholds of the visible crosstalk of the different brightness of the red, green and blue colors can be calculated, in which in the case of better uniformity and a certain brightness range, the visible crosstalk is apt to occur; in the case of poor uniformity of the bottom color block, the visible crosstalk is less likely to occur; and in the case of higher or lower brightness of the top color block, the visible crosstalk is also less likely to occur, but the bottom color block and the top color block can cause crosstalk in the intermediate color block.

At step 204-g, the color blocks in the color block set are sorted in accordance with the color uniformity of each of the color blocks.

After completion of identification and processing of the image, a coupling voltage between the color blocks needs to be calculated. Finally, according to the probability order of the crosstalk of the color blocks, for example, the color blocks are sorted in a unit of a color block set in a vertical direction (such as column or frame conversion) and/or a horizontal direction (such as row or frame conversion) according to the color uniformity from largest to smallest, so as to calculate the coupling voltage. The priority of the color block sorting can be selected as follows:

1) priority of color block type

In an exemplary embodiment, with reference to the level of the color block, the color blocks can be sorted in the following order: the intermediate color block>the top color block>the bottom color block (in order of the color block uniformity from good to poor, it can be set to merely calculate the intermediate color blocks as required), wherein the computational order is related to the efficiency of the algorithm, but is not limited thereto.

2) priority of color block size referring to color block width & color block height:

the priority of the color block having a large width>the priority of the color block having a small width (for example, when vertical crosstalk occurs, the width of the color block is related to the area of the visible crosstalk, and a large area denotes to a strong crosstalk in the horizontal direction);

the priority of the color block having a large height>the priority of the color block having a small height (for example, when vertical crosstalk occurs, the height of the color block is related to the coupling voltage, and a large height denotes to a strong crosstalk in the vertical direction).

At step 205, a coupling voltage of each of the color blocks and a brightness difference corresponding to the coupling voltage are calculated in accordance with an order of the color blocks included in the color block set.

According to an exemplary embodiment of the present invention, the coupling voltage to which a certain intermediate color block is subjected is firstly calculated in accordance with the order of the color blocks. In an embodiment, if the calculation of the coupling voltage of a certain color block may lead to a visible crosstalk, the calculation is stopped, the crosstalk voltage of other color blocks is not calculated, and a source inversion of the overall picture switching is employed. In another embodiment, the calculation is for all the color blocks, the relevant color blocks in which the crosstalk may occur are determined, and the source inversion of the associated color blocks is locally inverted (the vertical crosstalk is improved by changing the frame or column inversion to the dot or row inversion; and the horizontal crosstalk is improved by changing the frame or row inversion to the dot or column inversion).

According to an exemplary embodiment of the present invention, step 205 may comprise steps 205-*a* to 205-*d*.

At step 205-*a*, color information of each of sub-pixels in the reference image is acquired in accordance with the order of the color blocks included in the color block set.

According to an exemplary embodiment of the present invention, in the LCD, if the color is composed by the red, green, and blue three primary colors, the color information of the RGB pixels is converted into color information of the red, green and blue sub-pixels.

At step 205-*b*, a color voltage corresponding to each of the color blocks is calculated in accordance with the color information of each of sub-pixels.

Figure 5:
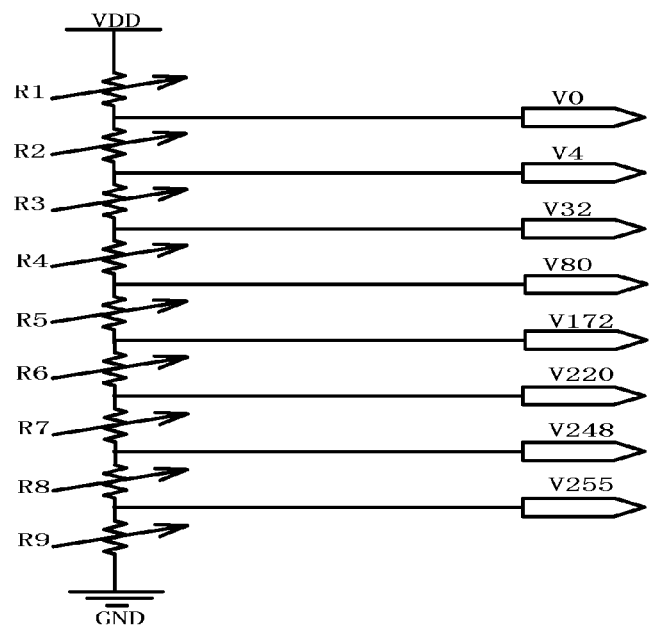
FIG. 5 is a structural schematic view of a gamma circuit of a pixel driving circuit according to one embodiment of the present invention.

After inputting the image color information to the LCD driving circuit, it is converted into the color voltage corresponding to the color block. The gray-scale of the sub-pixel of the LCD indicates the color voltage. For example, in a gamma circuit of the LCD driving integrated circuit shown in FIG. 5, a system may calculate voltage values of the color voltages corresponding to all the gray-scales by a circuit composed by a VDD and R1 to R9 (the actual calculation of the different IC gamma voltages is slightly different, and the corresponding gamma circuit architecture may be referred to).

At step 205-*c*, the coupling voltage to which each of the color blocks is subjected is calculated in accordance with the color voltage corresponding to each of the color blocks.

From the above, the system can convert the color gray-scale value into the color voltage by the gamma circuit of the LCD driving circuit, and then calculate the coupling voltage to which the intermediate color block is subjected according to the crosstalk coupling voltage principle, which is added to the voltage after the capacitive coupling effect to obtain the actual color voltage value the pixel. The coupling voltage is obtained by subtracting a set voltage from the actual color voltage value Vpij, wherein the basic unit of the TFT-LCD is a sub-pixel, such that the calculation of the coupling voltage is carried out in units of sub-pixels, and the coupling voltages of the red, green and blue pixels are respectively calculated.

Figure 6:
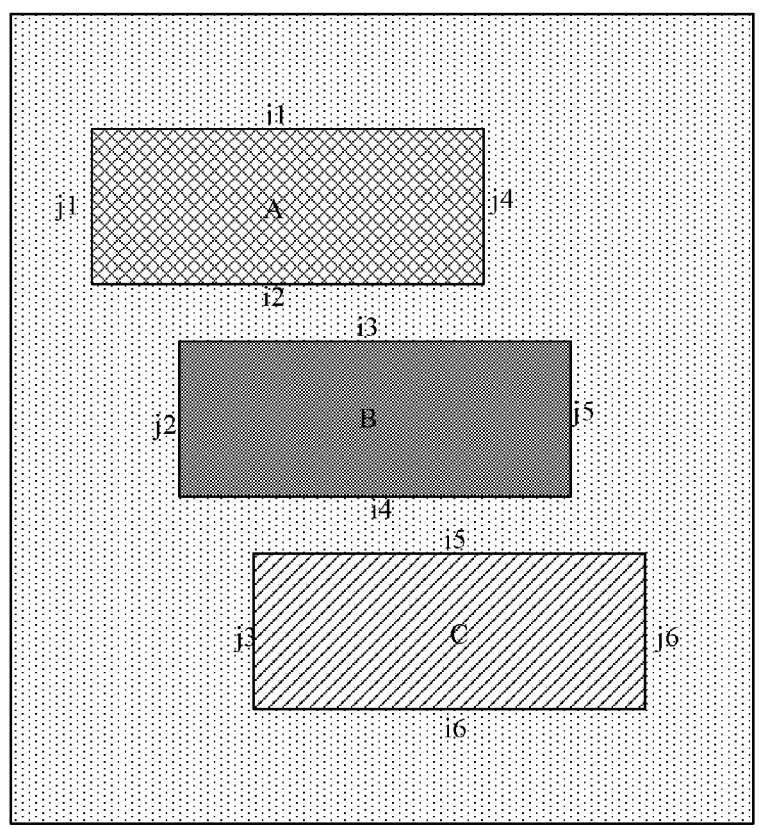
FIG. 6 is a schematic view of a division structure of a color block set according to one embodiment of the present invention.
Figure 7:
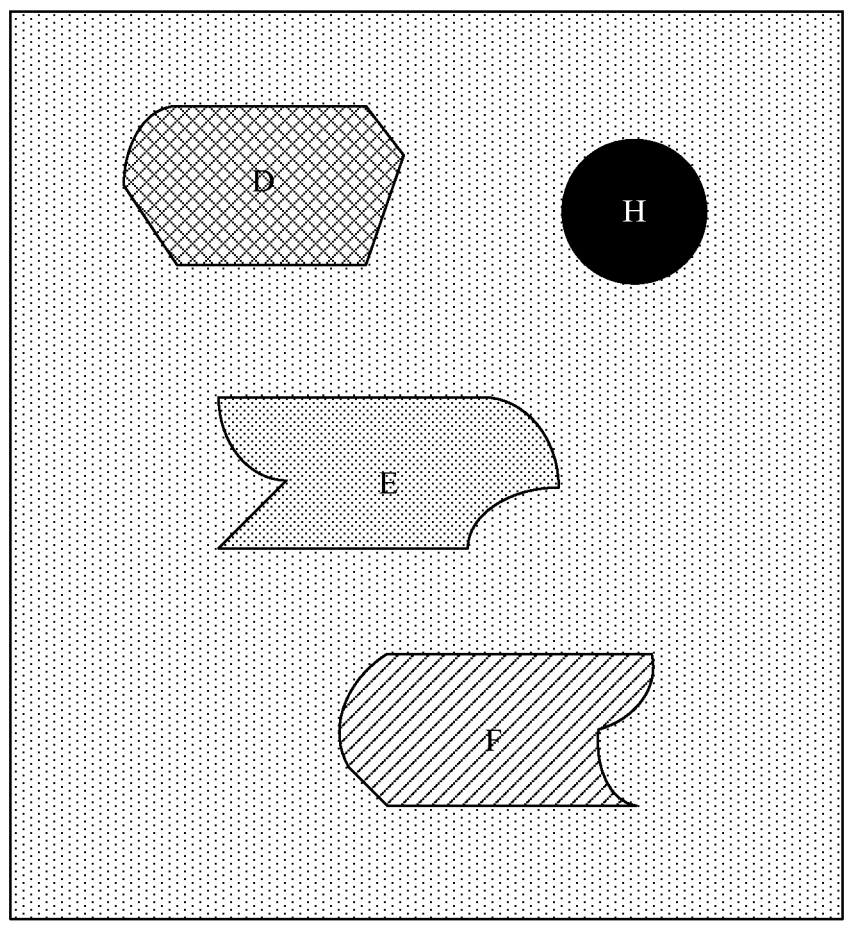
FIG. 7 is a schematic view of a division structure of a color block set according to another embodiment of the present invention.

At step 205-*c*, in order to improve the calculation efficiency, the representative parameter points (such as maximum voltage value, minimum voltage value, average voltage value, standard deviation, CPK, etc.) in the color block in units of points (n*pixel) may be selected and calculated. The coupling voltage range and/or density distribution is calculated according to the maximum voltage value, minimum voltage value, average voltage value, standard deviation, or CPK. Meanwhile, a series of dots may also be selected evenly in a physical position of the color block; or more selection points may also be selected, or the coupling voltage for all point pixels may be calculated. In practice, the crosstalk is usually measured by some color blocks having regular patterns, such as the rectangular color blocks A, B and C shown in FIG. 6. FIG. 6 shows the coordinate boundaries of each color block, but in actual use, color blocks are often of various shapes, such as D, E, F and H in FIG. 7. Whether the regular or irregular color blocks, according to the voltage coupling principle of the TFT-LCD circuit, the coupling voltages (vertical crosstalk) of the pixels caused by the same column of other pixels may be calculated in column. Or the coupling voltages (horizontal crosstalk) of the pixels caused by the same row of other pixels may be calculated in row.

Here, the priority for calculating the coupling voltage may follow the ways below:

in the case of frame inversion: the coupling voltage of vertical crosstalk is preferentially calculated, and after the calculation, the coupling voltage of horizontal crosstalk is calculated if necessary;

in the case of column inversion: the coupling voltage in the column direction is only calculated, and the pixel coupling voltage to which the pixels in the color block set is subjected is calculated in a column direction; and in the case of row inversion: the coupling voltage in a row direction to which the pixels in the color block set in a row direction is subjected is only calculated.

At step 205-*d*, the brightness difference caused by the coupling voltage is calculated.

After step 205-*d* of calculating the brightness difference caused by the coupling voltage, the brightness difference caused by the coupling voltage can also be compared with an ideal brightness difference. When the amount of change in brightness is greater than a certain value and/or the area is greater than a certain value, the visible crosstalk will occur At step 206, a crosstalk is determined in accordance with the brightness difference corresponding to the coupling voltage.

The crosstalk is determined based on the brightness difference of the intermediate color block caused by the coupling voltage, and the relative threshold conditions for the occurrence of the visible crosstalk are directly related to the magnitude of the coupling voltage between different color blocks (such as the color block size, voltage difference between the intermediate color block and the top color block, and voltage difference between the intermediate color block and the bottom color block) and/or the brightness range of the intermediate color blocks (such as the voltage range). The visible crosstalk is clearly visible under a certain brightness, such that the threshold can be obtained by calculating the corresponding brightness at which the crosstalk occurs in red, green, blue and gray conditions through experimental methods.

At step 207, a driving mode is switched in accordance with the crosstalk.

As described above, when the crosstalk identification process is completed, the process will feed that whether crosstalk has occurred. If yes, a feedback that the driving mode needs to be changed (for example, changing to 2 dots driving mode) is fed to the system, and if not, the driving mode is not changed. According to an exemplary embodiment of the present invention, the driving mode includes at least one of the frame inversion, the column inversion, the row inversion and the dot inversion.

The driving mode switching method according to an embodiment of the present invention can be capable of firstly acquiring a pre-processed reference image; identifying an image characteristic of the reference image, wherein the image characteristic comprises an image edge and/or an image color region; generating a color block set included in the reference image by dividing the reference image into color blocks in accordance with the identification of the image characteristic of the reference image; calculating a coupling voltage of each of the color blocks and a brightness difference corresponding to the coupling voltage in accordance with an order of the color blocks included in the color block set; determining a crosstalk in accordance with the brightness difference corresponding to the coupling voltage; and finally switching a driving mode in accordance with the crosstalk. Since the driving mode can be switched, it is possible to prevent the display from being prone to crosstalk due to being constantly arranged to the column inversion mode, the row inversion mode or the frame inversion mode, or a display abnormality that may occur due to being arranged to the dot inversion driving.

Figure 8:
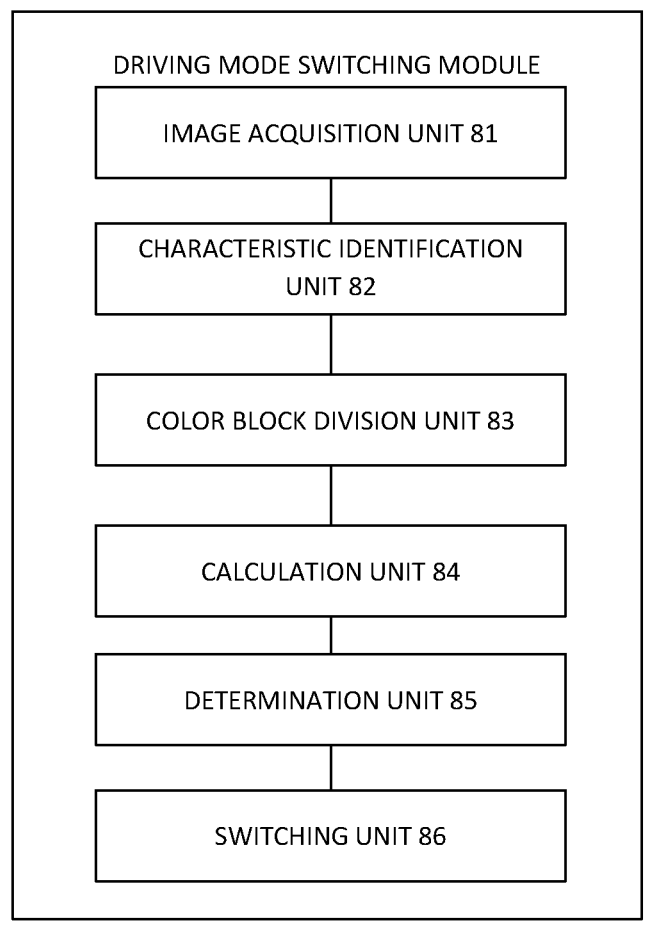
FIG. 8 is a structural schematic view of a driving mode switching module according to one embodiment of the present invention.

Referring to FIG. 8, a driving mode switching module according to an exemplary embodiment of the present invention may comprise:

an image acquisition unit 81, arranged to acquire a pre-processed reference image;

a characteristic identification unit 82, arranged to identify an image characteristic of the reference image, wherein the image characteristic comprises an image edge and/or an image color region;

a color block division unit 83, arranged to generate a color block set included in the reference image by dividing the reference image into color blocks in accordance with the identification of the image characteristic of the reference image;

a calculation unit 84, arranged to calculate a coupling voltage of each of the color blocks and a brightness difference corresponding to the coupling voltage in accordance with an order of the color blocks included in the color block set;

a determination unit 85, arranged to determine a crosstalk in accordance with the brightness difference corresponding to the coupling voltage; and a switching unit 86, arranged to switch a driving mode in accordance with the crosstalk.

Figure 9:
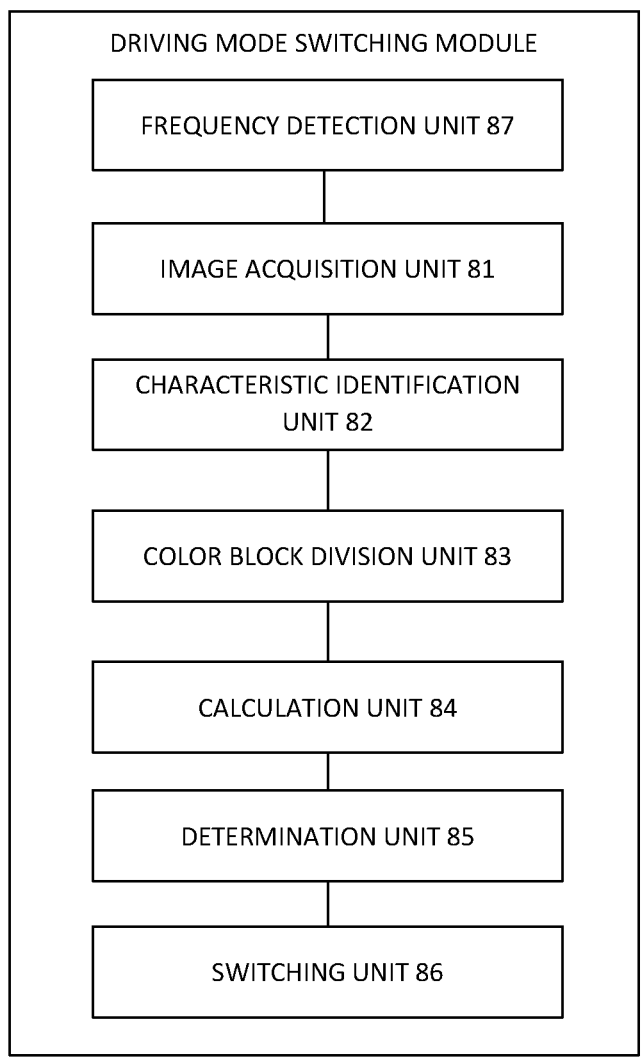
FIG. 9 is a structural schematic view of a driving mode switching module according to another embodiment of the present invention.

According to an exemplary embodiment of the present invention, as shown in FIG. 9, the module further comprises:

a frequency detection unit 87, arranged to determine an image update frequency of a display device, and acquiring the pre-processed reference image when the image update frequency is less than a first preset frequency, wherein the first preset frequency is a critical frequency of the crosstalk visible to the human eye.

According to an exemplary embodiment of the present invention, the image acquisition unit 81 may comprise:

a reading subunit 811, arranged to read a display image to be output to a display panel from a graphics memory; and a de-noising subunit 812, arranged to acquire the reference image by performing a de-noising processing on the display image, and allocate a processing space having a first capacity to the reference image in the graphics memory.

According to an exemplary embodiment of the present invention, the characteristic identification unit 82 may comprise:

an edge extracting subunit 821, arranged to extract an image edge included in the reference image; and a color extracting subunit 822, arranged to extract an image color region included in the reference image.

According to an exemplary embodiment of the present invention, the color block division unit 83 may comprise:

a division subunit 831, arranged to divide the reference image into a plurality of color blocks in accordance with the image edge and/or the image color region included in the reference image; and a definition subunit 832, arranged to define continuous color blocks that intersect in a column direction or a horizontal direction as the color block set.

According to an exemplary embodiment of the present invention, the calculation unit 84 may comprise:

a color information acquisition subunit 841, arranged to acquire color information of each of sub-pixels in the reference image in accordance with the order of the color blocks included in the color block set;

a color voltage calculation subunit 842, arranged to calculate a color voltage corresponding to each of the color blocks in accordance with the color information of each of sub-pixels;

a coupling voltage calculation subunit 843, arranged to calculate the coupling voltage to which each of the color blocks is subjected in accordance with the color voltage corresponding to each of the color blocks; and a brightness calculation subunit 844, arranged to calculate the brightness difference caused by the coupling voltage.

According to an exemplary embodiment of the present invention, the calculation unit 84 further comprises:

an uniformity calculation subunit 845, arranged to calculate a color uniformity of each of the color blocks in the color block set, the color uniformity comprises a region uniformity and/or a color brightness characteristic;

when the region uniformity of a color block is less than a first color threshold, the uniformity calculation subunit 845 determines the color block as a bottom color block;

when the region uniformity of the color block is greater than or equal to the first color threshold, and the color brightness characteristic is greater than or equal to a second color threshold and is less than or equal to a third color threshold, the uniformity calculation subunit 845 determines the color block as a intermediate color block;

when the region uniformity of the color block is greater than or equal to the first color threshold, and the color brightness characteristic is less than the second color threshold, or when the region uniformity of the color block is greater than or equal to the first color threshold, and the color brightness characteristic is greater than the third color threshold, the uniformity calculation subunit 845 determines the color block as a top color block; and a sorting subunit 846, arranged to sort the color blocks in the color block set in accordance with the color uniformity of each of the color blocks.

It is to be noted that the above-mentioned functional units and subunits may be implemented as separate processors or integrated into a single processor (GPU or CPU) of the user equipment. Further, they may be stored in the form of program code in a memory, and a function of each of the above units or subunits may be called and performed by a certain processor of the apparatus. The processor described herein may be a CPU, an application specific integrated circuit ASIC, or one or more integrated circuits configured to implement embodiments of the present invention.

The driving mode switching module according to the embodiment of the present invention can be capable of firstly acquiring a pre-processed reference image; identifying an image characteristic of the reference image, wherein the image characteristic comprises an image edge and/or an image color region; generating a color block set included in the reference image by dividing the reference image into color blocks in accordance with the identification of the image characteristic of the reference image; calculating a coupling voltage of each of the color blocks and a brightness difference corresponding to the coupling voltage in accordance with an order of the color blocks included in the color block set; determining a crosstalk in accordance with the brightness difference corresponding to the coupling voltage; and finally switching a driving mode in accordance with the crosstalk. Since the driving mode can be switched, it is possible to prevent the display from being prone to crosstalk due to being constantly arranged to the column inversion mode, the row inversion mode or the frame inversion mode, or a display abnormality that may occur due to being arranged to the dot inversion driving.

According to an exemplary embodiment of the present invention, a display device is also provided, which comprises any one driving mode switching module described as above. In addition, the display device may also be a display device such as an electronic paper, a mobile phone, a TV, a digital photo frame or the like.

The display device according to the embodiment of the present invention can be capable of firstly acquiring a pre-processed reference image; identifying an image characteristic of the reference image, wherein the image characteristic comprises an image edge and/or an image color region; generating a color block set included in the reference image by dividing the reference image into color blocks in accordance with the identification of the image characteristic of the reference image; calculating a coupling voltage of each of the color blocks and a brightness difference corresponding to the coupling voltage in accordance with an order of the color blocks included in the color block set; determining a crosstalk in accordance with the brightness difference corresponding to the coupling voltage; and finally switching a driving mode in accordance with the crosstalk. Since the driving mode can be switched, it is possible to prevent the display from being prone to crosstalk due to being constantly arranged to the column inversion mode, the row inversion mode or the frame inversion mode, or a display abnormality that may occur due to being arranged to the dot inversion driving.

Those of ordinary skill in the art will recognize that the elements and algorithms steps of the various examples described in connection with the embodiments disclosed herein may be implemented in electronic hardware, computer software, or a combination of both. In order to clearly illustrate interchangeability between hardware and software, the components and steps of the examples have been described generally in terms of functionality. Whether these functions are implemented in hardware or software depends on the specific application and design constraints of the technical solution. A skilled artisan may use different methods for implementing the described functions for each particular application, but such implementations should not be considered to be beyond the scope of the present invention.

In several embodiments provided herein, it is to be understood that the disclosed systems, devices, and methods may be implemented in other ways. For example, the embodiment of the device described above is merely illustrative, for example, the division of the unit is only one division of logical function, and the actual implementation may have an additional division manner, e.g. multiple units or components may be combined or can be integrated into another system, or some features can be ignored, or not implemented. In addition, the coupling or direct coupling or communication connection between each other as shown or discussed may be indirect coupling or communication connection through some interfaces, devices, or units, or may be electrical, mechanical, or other forms of connection.

The elements described as separate components may or may not be physically separated, and the components displayed as units may or may not be physical units, that is, may be located in one place or may be distributed over a plurality of network elements. Some or all of the units may be selected according to actual needs to realize the object of the embodiment of the present invention.

In addition, various functional units in the various embodiments of the present invention may be integrated in one processing unit, or each unit may be physically separate or two or more units may be integrated in one unit. The above-mentioned integrated unit can be realized in the form of hardware or software functional unit.

The integrated unit may be stored in a computer-readable storage medium if it is implemented in the form of a software functional unit and sold or used as a separate product. Based on this understanding, the technical solutions of the present disclosure or essentially the portions which contributes to the prior art, or all or part of the technical solutions, may be embodied in the form of a software product, which is stored in a storage medium, and several instructions are included to enable a computer device (which may be a personal computer, server, or network device, etc.) to perform all or part of the steps of the methods described in the various embodiments of the present invention.

The storage medium described as above includes a USB disk, a removable hard disk, a ROM (Read-Only Memory), a random access memory (RAM), a magnetic disk, an optical disk, and the like, which can store program code.

The above description is only specific embodiments of the present invention, but the scope of the present invention is not limited thereto. Changes or replacements within the technical scope of the present invention, which can be easily acquired by any skilled in the art, should be encompassed within the scope of the present invention. Accordingly, the scope of the present invention should be based on the scope of the claims attached.

The invention claimed is:
1. A driving mode switching method, comprising:
acquiring a pre-processed reference image;
identifying an image characteristic of the reference image;
generating a color block set included in the reference image by dividing the reference image into color blocks in accordance with the identification of the image characteristic of the reference image;
calculating a coupling voltage of each of the color blocks and a brightness difference corresponding to the coupling voltage in accordance with an order of the color blocks included in the color block set;
determining a crosstalk in accordance with the brightness difference corresponding to the coupling voltage; and
switching a driving mode in accordance with the crosstalk.

2. The driving mode switching method of claim 1, wherein before acquiring the pre-processed reference image, the method further comprises:
   determining an image update frequency of a display device, and acquiring the pre-processed reference image when the image update frequency is less than a first preset frequency.

3. The driving mode switching method of claim 1, wherein acquiring the pre-processed reference image comprises:
   reading a display image to be output to a display panel from a graphics memory; and
   acquiring the reference image by performing a de-noising processing on the display image.

4. The driving mode switching method of claim 3, wherein acquiring the pre-processed reference image further comprises: allocating a processing space having a first capacity to the reference image in the graphics memory.

5. The driving mode switching method of claim 1, wherein identifying the image characteristic of the reference image comprises:
   extracting an image edge included in the reference image; and/or
   extracting an image color region included in the reference image.

6. The driving mode switching method of claim 5, wherein generating the color block set included in the reference image by dividing the reference image into color blocks in accordance with the identification of the image characteristic of the reference image comprises:
   dividing the reference image into a plurality of color blocks in accordance with the image edge and/or the image color region included in the reference image; and
   defining continuous color blocks that intersect in a column direction or a horizontal direction as the color block set.

7. The driving mode switching method of claim 1, wherein calculating the coupling voltage of each of the color blocks and the brightness difference corresponding to the coupling voltage in accordance with the order of the color blocks included in the color block set comprises:
   acquiring color information of each of sub-pixels in the reference image in accordance with the order of the color blocks included in the color block set;
   calculating a color voltage corresponding to each of the color blocks in accordance with the color information of each of sub-pixels;
   calculating the coupling voltage to which each of the color blocks is subjected in accordance with the color voltage corresponding to each of the color blocks; and
   calculating the brightness difference caused by the coupling voltage.

8. The driving mode switching method of claim 1, wherein the method further comprises:
   calculating a color uniformity of each of the color blocks in the color block set; and
   sorting the color blocks in the color block set in accordance with the color uniformity of each of the color blocks.

9. The driving mode switching method of claim 8, wherein the color uniformity comprises a region uniformity and/or a color brightness characteristic.

10. The driving mode switching method of claim 9, wherein the method further comprises:
    determining a color block as a bottom color block if the region uniformity of the color block is less than a first color threshold;
    determining a color block as a intermediate color block if the region uniformity of the color block is greater than or equal to the first color threshold and the color brightness characteristic of the color block is greater than or equal to a second color threshold and is less than or equal to a third color threshold; and
    determining a color block as a top color block if the region uniformity of the color block is greater than or equal to the first color threshold and the color brightness characteristic of the color block is less than the second color threshold or if the region uniformity of the color block is greater than or equal to the first color threshold and the color brightness characteristic of the color block is greater than the third color threshold.

11. A driving mode switching module, comprising:
    an image acquisition unit arranged to acquire a pre-processed reference image;
    a characteristic identification unit arranged to identify an image characteristic of the reference image;
    a color block division unit arranged to generate a color block set included in the reference image by dividing the reference image into color blocks in accordance with the identification of the image characteristic of the reference image;
    a calculation unit arranged to calculate a coupling voltage of each of the color blocks and a brightness difference corresponding to the coupling voltage in accordance with an order of the color blocks included in the color block set;
    a determination unit arranged to determine a crosstalk in accordance with the brightness difference corresponding to the coupling voltage; and
    a switching unit arranged to switch a driving mode in accordance with the crosstalk.

12. The driving mode switching module of claim 11, wherein the module further comprises:
    a frequency detection unit arranged to determine an image update frequency of a display device, and to instruct the image acquisition unit to acquire the pre-processed reference image when the image update frequency is less than a first preset frequency.

13. The driving mode switching module of claim 11, wherein the image acquisition unit comprises:
    a reading subunit arranged to read a display image to be output to a display panel from a graphics memory; and
    a de-noising subunit arranged to acquire the reference image by performing a de-noising processing on the display image.

14. The driving mode switching module of claim 11, wherein the characteristic identification unit comprises:
    an edge extracting subunit arranged to extract an image edge included in the reference image; and/or
    a color extracting subunit arranged to extract an image color region included in the reference image.

15. The driving mode switching module of claim 14, wherein the color block division unit comprises:
    a division subunit arranged to divide the reference image into a plurality of color blocks in accordance with the image edge and/or the image color region included in the reference image; and
    a definition subunit arranged to define continuous color blocks that intersect in a column direction or a horizontal direction as the color block set.

16. The driving mode switching module of claim 11, wherein the calculation unit comprises:
    a color information acquisition subunit arranged to acquire color information of each of sub-pixels in the reference image in accordance with the order of the color blocks included in the color block set;

a color voltage calculation subunit arranged to calculate a color voltage corresponding to each of the color blocks in accordance with the color information of each of sub-pixels;

a coupling voltage calculation subunit arranged to calculate the coupling voltage to which each of the color blocks is subjected in accordance with the color voltage corresponding to each of the color blocks; and a brightness calculation subunit arranged to calculate the brightness difference caused by the coupling voltage.

17. The driving mode switching module of claim 16, wherein the calculation unit further comprises:

an uniformity calculation subunit arranged to calculate a color uniformity of each of the color blocks in the color block set; and a sorting subunit arranged to sort the color blocks in the color block set in accordance with the color uniformity of each of the color blocks.

18. The driving mode switching module of claim 17, wherein the color uniformity comprises a region uniformity and/or a color brightness characteristic.

19. The driving mode switching module of claim 18, wherein the uniformity calculation subunit is further arranged to:

determine a color block as a bottom color block if the region uniformity of the color block is less than a first color threshold;

determine a color block as a intermediate color block if the region uniformity of the color block is greater than or equal to the first color threshold and the color brightness characteristic of the color block is greater than or equal to a second color threshold and is less than or equal to a third color threshold; and determine a color block as a top color block if the region uniformity of the color block is greater than or equal to the first color threshold and the color brightness characteristic of the color block is less than the second color threshold or if the region uniformity of the color block is greater than or equal to the first color threshold and the color brightness characteristic of the color block is greater than the third color threshold.

20. A display device, comprising the driving mode switching module of claim 11.

* * * * *